July 19, 1966 S. KOHN 3,261,995
COOLING SYSTEM FOR ELECTRICAL MACHINES
Filed March 1, 1963 2 Sheets-Sheet 1

INVENTOR
Stephane KOHN
ATTORNEYS

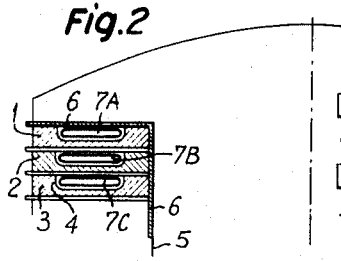
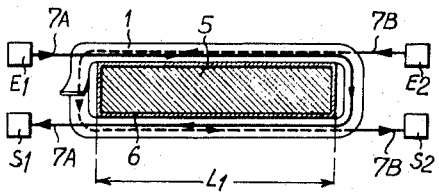
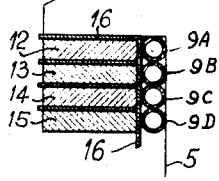
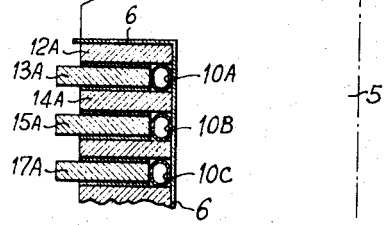
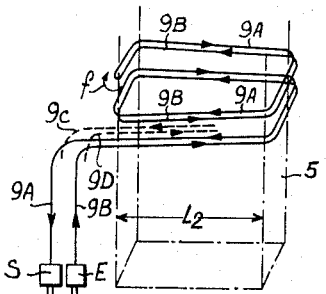
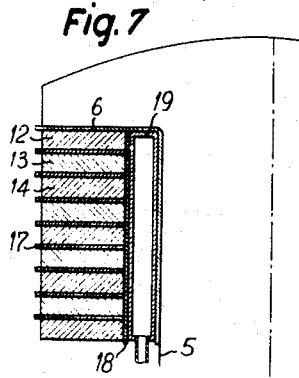
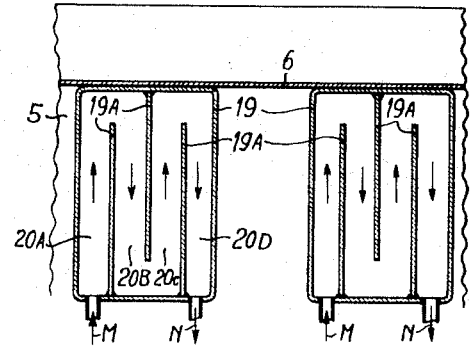
INVENTOR
Stephane KOHN 12
United States Patent Office 3,261,995
Patented July 19, 1966

3,261,995
COOLING SYSTEM FOR ELECTRICAL MACHINES
Stéphane Kohn, Saint-Cloud, France, assignor to Société Anonyme dite: Forges et Ateliers de Constructions Electriques de Jeumont, Paris, France
Filed Mar. 1, 1963, Ser. No. 261,989
Claims priority, application France, Mar. 7, 1962, 890,319; Mar. 27, 1962, 892,401
11 Claims. (Cl. 310—64)

The present invention relates to improvements in the cooling of the windings of electrical machines by a cooling liquid. It applies particularly, although not exclusively, to rotors of large machines having salient poles. Adequately solving this problem is becoming more and more difficult because of the present developments in modern machines such as alternators, developments which are characterized by an appreciable increase in their power and an increase in centrifugal and vibratory stresses, all of which require economcial and sturdy machines, a good mechanical performance at overspeeds and a highly efficient withdrawal of great quantities of heat generated in the windings.

The known solution, theoretically excellent, which consists in using hollow conductors, the axial channels of which are filled with a cooling fluid offers many difficulties; the manufacture is delicate as hollow conductors are difficult to make, long flow channels give rise to excessive friction losses and the mechanical strength thereof is uncertain. It has also been proposed to associate with normal windings, made up of solid conductors, cooling ducts disposed in good thermal contact with the windings but in known installations of this kind it has been observed that first; they give rise to large friction losses which require heavy pressures with inherent danger of leaks, second; the temperatures of the fluids used are appreciably higher at the outlet of the ducts than at the inlet thereof so that heating of the windings is very unevenly distributed and this causes irregular thermal expansion and thermal stresses which dangerously affect the dielectric characteristics and mechanical performance of the windings particularly in the case of rotors having salient poles.

An object of the present invention is to overcome the above mentioned drawbacks by providing means for cooling the conductors, such means being housed around the magnetic cores or in grooves. The application is particularly interested in improved means which make it possible to use simple solid conductors, the cooling of which is carried out in such a way that heating of the windings is practically homogeneous, the conductors being associated with relatively short cooling ducts of simple design offering very little flow resistance and very efficiently withdrawing the resistance heat of the conductors. Generally, the invention is directed to devices that are simple, sturdy, efficient and economical.

In order to obtain these results, the applicant proposes to use prefabricated cooling ducts having the form of open tubular loops of limited length, interconnected for operating under low pressure and having each at least two branches which are adjoined to the turns to be cooled in good thermal contact, each of the branches being arranged so that the coolant liquid which may be water flows therein in a direction essentially reverse to that of the adjacent branches to which it is associated, according to the principle of counter currents, in such a way as to equalize the temperature of the cooled turns by means of reciprocal heat transfer.

The invention will be described in relation to the particular case of electrical machines having salient rotor poles. The embodiments are illustrated in the appended drawings, wherein:

FIG. 2 is a partial cross-section of a salient pole having field winding conductors provided with longitudinal grooves for carrying associated cooling branches;

FIG. 3 is a horizontal cross-section of the pole of FIG. 2;

FIGS. 4 and 5 are partial vertical cross-sections similar to that of FIGURE 1 wherein the rectangular conductors are associated with lateral coolant loops;

FIGURE 6 is a diagrammatic perspective view of a core illustrated with another coiled loop arrangement;

FIGURES 7 and 8 are, respectively, vertical and lateral cross-sections of multiple loop ducts having the form of resilient caissons.

Figure 1:
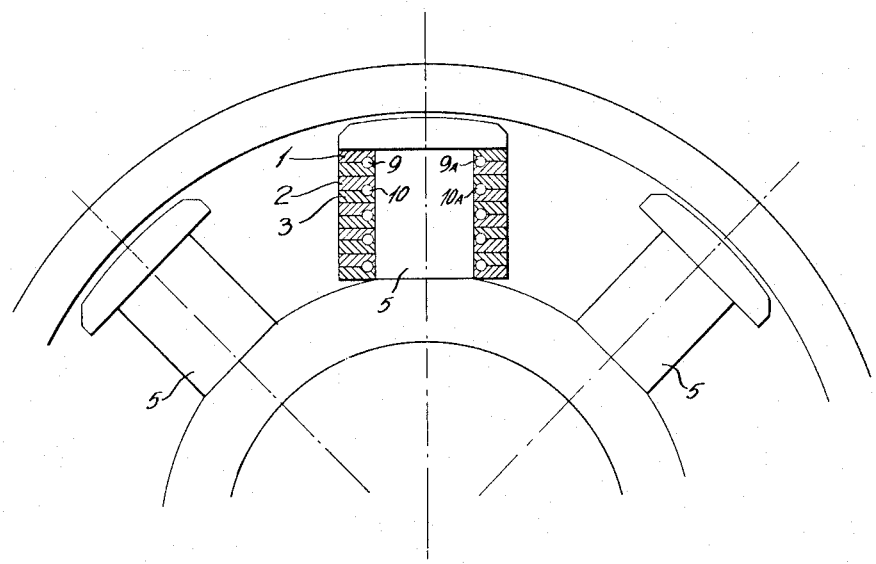
FIG. 1 is a partial cross-section of an electrical machine equipped with a cooling system according to the invention.

In FIG. 1 which generally represents the application of the invention, there is represented a partial cross-section of a dynamo-electrical machine known in the art having a stator St and a rotor R having many salient poles which carry superposed energizing helicoidal windings surrounding the cores 5. Each winding is formed by a conductive bar having a large rectangular cross-section and conveniently insulated by means not shown.

According to the invention, to individual windings 1, 2 and 3 or to groups of two or more windings, are elastically associated with good thermal contacts, as opposed to electric ones, tubular cooling ducts 9, 10 etc. and 9A, 10A etc. wherein flows a refrigerating liquid which could be noninsulating. These ducts are prefabricated and are built in advance in order to form a system or a series of loops relatively short, each carrying at least two branches. Each loop can thus comprise branches 9 and 10 or 9 and 9A.

After having set up this system or series of loops, the ends of the respective branches are interconnected, for example in series parallel connection, so as to offer a weak resistance to the circulation of the refrigerating material. These branches are connected to appropriate input and output commutators which will be represented hereinafter.

These interconnections are carried out in such a way that the direction of the circulation in each branch is opposed to the one in the next branch.

The association and the assembly of the tubular branches with the energizing windings could be carried out in many different ways, such as by inserting the branches between the superposed windings, or laterally between the windings and the core.

An example of this first type is represented in FIG. 2, in which magnetic core 5 comprises an insulating frame on which are housed turns 1, 2, 3, etc., of one or several conductors having a substantially rectangular cross-section and obtained by machining or drawing, for instance, and recessed with longitudinal grooves 4. In each of these grooves is housed a tubular duct 7A, 7B, etc., made of metal having a suitable high mechanical resistance and having a circular, rectangular, oval, etc., cross-section. These ducts, provided for the flow of a cooling fluid such as water, are prefabricated in the form of loops having two branches which are inserted longitudinally between the turns 1, 2, 3, etc.

According to FIGURE 3, the ends of the loops are connected in parallel by means of inlet headers $E_1$ and $E_2$; the liquid is sent to outlet headers $S_1$ and $S_2$. It should particularly be noted that the inlet and outlet of one particular loop are on the same side which is the side opposite that of the inlet and outlet of the immediately adjacent loops whereby the directions of flow circulating in immediately adjoining branches are always reversed. This arrangement of straight loops is advantageous when the axial length $L_1$ of the cores 5 is large as is often the case in high powdered modern machines.

The outer surfaces of ducts 7A, 7B, etc., through which electric current does not flow, are covered with a thin insulating and resilient layer obtained by wrapping, varnishing, enameling or any other processes which would give a sufficient insulation and a good thermal conductivity. In order to increase their thermal contact with the surfaces of the grooves 4, the ducts may be soaked during assembly in an appropriate resinous insulator, preferably hardened, which will act to eliminate any air pockets that may act as thermal barriers. It is also preferable that the ducts be resiliently clamped between the adjacent turns of the windings. The compression stress thus obtained will contribute to improving the thermal contacts as well as the mechanical performance of the winding with regard to any centrifugal stresses that may develop.

In such an arrangement, it is possible to obtain not only a good thermal contact of the loops with the turns of the winding but each loop, for instance 7B, is located between the two loops 7A and 7C through which a liquid flows in opposite direction; with them, loop 7B creates heat exchanges which are sufficiently strong so that an even temperature will set in all of the length of the co-operating loops so that all of the cooled winding will be maintained at the same temperature.

In the arrangement of FIGURE 4, branches 9A, 9B of a first loop, branches 9C, 9D of another loop, etc., are arranged between core 5 and winding frame 16, which winding is constituted by conductors having a simple rectangular cross-section. Such branches, which in this case need not be insulated, are in thermal contact with turns 12, 13, etc., and preferably in direct contact between themselves.

In the embodiment according to FIGURE 5, each of the insulated branches 10A, 10B, 10C, etc., of various loops is thermally associated with three conductors of the rectangular cross-section winding.

Alternate conductors 13A, 15A, 17A, etc., are radially offset as shown in order to form housings within which the branches are received. In FIGURES 3 and 4, the ducts are preferably set into a mass of a good thermal conductivity material to fill in voids and improve heat transfers between the winding and the ducts as well as between neighbouring branches. The transverse cross-section of the ducts according to FIGURES 4 and 5 may be rectangular.

If the axial length $L_2$ of the core shown in FIGURE 6 is smaller than length $L_1$ according to FIGURE 2, the loops of the cooling ducts may be serially grouped as in FIGURE 6 wherein the various branches of each loop, such as 9A, 9B for instance are connected to a pair of common inlet and outlet headers E and S respectively, which may be located near the base of core 5. These ducts constitute a two branch loop having, for instance, the shape of a hair pin, the end of which is closed as shown by curved arrow designated $f$. This loop is coiled in helix around the core in order to be laterally associated with the winding turns according to FIGURES 3, 4 and 5. Another coiled loop, formed for instance by branches 9C and 9D and connected for instance in parallel to the same headers E and S, may constitute a second helix, similar to the first one and located between the coils of the preceding helix.

It is seen that in this arrangement the liquid in adjacent branches of the loops is always flowing in opposite directions; this will make it possible, as in the case of previous figures, to obtain a practically even temperature throughout the whole field winding and this by the same rational application of the principle of counter currents.

Instead of being wound around the pole, as indicated in FIG. 6, the loops of FIGS. 4 and 5 may be mounted in zig-zag fashion or in one or several lateral planes which are parallel to the faces of core 5.

The arrangement according to FIGS. 7 and 8 is directed to improving the cooling efficiency and the thermal exchanges between the branches by means of cooling elements in the form of flat parallelepipeds 19. Core 5 comprises a ninsulating frame 6 within which are housed the turns 12, 13, 14, etc. of solid conductors having a rectangular cross-section. Metallic jackets 19 of flat parallelepiped form are arranged between this frame 6 and conductors 12 to 17, the said jackets being separated from the conductors by insulating sheet 18. The cooling fluid flows in said jackets by being guided by interior walls 19A which form sinuous loops whose branches 20A to 20D traverse the turns according to the arrows in one direction or the other in such a way that all the turns of the winding are, as in the preceding cases, cooled with the same efficiency and reach practically the same temperature. The various jackets 19 are preferably connected in parallel or series- parallel by their inlets M and their outlets N. Their sides are dimensioned and assembled with the wall 19A in such a manner as to offer the necessary flexibility which favours a good thermal contact with the conductors through the insulating sheets 18.

According to a variation of FIGURE 7, jackets 19 instead of being located between a row or pile of stacked conductors 12, 13, etc., and core 5 may be disposed between two parallel piles of conductors, each half the width of those of FIGURE 7.

In all of the various embodiments just described, it is possible to take the necessary measures to reduce the phenomenon known as "superturbulence" and which shows itself by stopping of the liquid flow due to centrifugal forces. This effect may be counteracted, for instance, by providing at the inlet and at the outlet of the cooling ducts, appropriate guiding members designed according to the technique of centrifugal pumps.

It is to be noted that apart from the advantages which are derived from the various embodiments described above and resulting from the rational application of the reverse circulation heat exchange principle, the above described arrangements are futher distinguishable by the fact that they may be prefabricated in simple and sturdy refrigerating loops by freely choosing the most appropriate material and that the loops are easily mounted without substantially increasing the volume of the windings in such a way as to be able to withstand in the most favourable conditions all mechanical stresses of a static, dynamic or vibratory nature as well as any thermal stresses.

I claim:

1. In a cooling system for rotating field windings of electrical machines with salient magnetic cores each being surrounded by superposed turns of heavy conductor bars of substantially rectangular cross-section, the combination comprising a distinct network formed by a plurality of separate tubular cooling ducts elastically assembled in good thermal, but not in electrical contact with said turns, said ducts being prefabricated in the form of loops having each at least two branches, each of said loops being closely attached to said field winding alongside at least one of said turns and located laterally with respect to said magnetic core; input and output headers for liquid coolant circulating in said loops, and interconnections between said loops and said headers to establish coolant circulation paths of limited length with a mutual reversal of the respective directions of coolant in all adjacent branches.

2. A cooling system for rotating field windings of electrical machines with salient poles as in claim 1, wherein said interconnections of said duct loops and said headers are arranged in parallel.

3. A cooling system for rotating field windings of electrical machines with salient poles as in claim 1, wherein at least some of said interconnections of said duct loops and said headers are arranged in series.

4. A cooling system for rotating field windings of electrical machines as in claim 1, wherein said loops have the form of rectangular jackets elastically inserted between said field windings and said cores, and comprising each a plurality of interior walls adapted to guide the coolant to flow in each of said jackets along a plurality of adjacent loops connected in series.

5. A cooling system for electrical machines as in claim 1, wherein said ducts are of relatively light-gauge metal joined to said conductors by a thin layer of electrically insulative and thermo-conductive bonding.

6. A cooling system for rotating field windings of electrical machines as in claim 1, wherein said ducts are located between adjacent branches of said turns.

7. A cooling system for rotating field windings of electrical machines as in claim 1, wherein said mounting of said loops closely alongside said turns is achieved by recessing said conductors to form grooves between said turns and inserting said loops into said grooves, whereby said cooling ducts are effectively clamped between adjacent turns of said windings upon assembly thereof.

8. A cooling system for rotating field windings of electrical machines as in claim 1, wherein each winding is cooled by at least one associated tubular loop having the form of a hair pin with two branches helically wound around said core so as to form at least one turn and interconnected in parallel to other similar loops with common headers, the branches of said hair pins being located in such an order that said coolant always flows through adjacent branches in opposite directions.

9. A cooling system for rotating field windings of electrical machines as in claim 1, wherein said ducts are located between said turns and said core.

10. A cooling system for rotating field windings of electrical machines as in claim 9, wherein said mounting of said loops closely alongside said turns is achieved by radially offsetting alternate turns from said core, whereby spaces are provided between said offset turns and core, said loops of cooling ducts being housed within said spaces in thermal contact with three adjacent turns of conductor.

11. A cooling system for rotating field windings of electrical machines as in claim 9, wherein said ducts traverse said turns in sinuous manner, whereby circulation in adjacent branches of said loops is in mutually reverse direction, said sinuous ducts being enclosed within flat parallelepiped jackets, at least one of said jackets being connected across said input and output headers to allow circulation of coolant through said sinuous ducts.

References Cited by the Examiner

UNITED STATES PATENTS

| | | | |
|---|---|---|---|
| 3,034,003 | 5/1962 | Seidner | 310—64 |
| 3,075,104 | 1/1963 | Willyoung et al. | 310—64 |

FOREIGN PATENTS

| | | |
|---|---|---|
| 433,209 | 8/1926 | Germany. |
| 1,027,312 | 4/1958 | Germany. |
| 1,089,056 | 9/1960 | Germany. |
| 769,762 | 3/1957 | Great Britain. |

MILTON O. HIRSHFIELD, *Primary Examiner.*

JOHN F. COUCH, ORIS L. RADER, *Examiners.*

L. L. SMITH, *Assistant Examiner.*